Oct. 11, 1966 T. M. HARRER ETAL 3,277,941
ROTARY TYPE KNIFE PEAR PEELER
Filed Feb. 10, 1964

INVENTORS
MALCOLM W. LOVELAND
THEODORE M. HARRER
BY
ATTORNEYS

United States Patent Office 3,277,941
Patented Oct. 11, 1966

3,277,941
ROTARY TYPE KNIFE PEAR PEELER
Theodore M. Harrer and Malcolm W. Loveland, Orinda, Calif., assignors to Atlas Pacific Engineering Company, a corporation of California
Filed Feb. 10, 1964, Ser. No. 343,801
5 Claims. (Cl. 146—43)

This invention relates to a cutter mechanism for peeling pears and the like and more particularly to a cutter mechanism which permits rapid adjustment of the cutter pressure on the fruit combined with a means of oscillation damping of the cutter as it moves over the surface of the fruit undergoing peeling, thereby preventing gouging of the fruit at soft or irregular spots as discussed in U.S. Patents 3,058,502 and 3,115,171.

Apparatus available heretofore for peeling fruit such as pears has made use of springs adjustably mounted to provide the peeling pressure and separate oscillation damping means to prevent gouging of the surface of the fruit undergoing peeling. When fruit ripeness conditions change which required an increase or decrease in the spring pressure, it was frequently necessary to increase or decrease the degree of damping to match. These adjustments were time consuming and required that the machine be shut down for the period of adjustment. Furthermore, wear of the parts frequently caused the degree of damping to decrease.

In the apparatus available heretofore, the cutter peeling pressure varied greatly since the pressure was provided by a spring which was deflected a great amount on large fruit and a lesser amount on small fruit, as well as varying greatly on the different diameters of the same fruit. The mechanism of this invention relies upon a gas pressure to govern the cutter pressure and the displacement of the piston compared to the reservoir capacity of the gas manifolds used is so small as to maintain a substantially constant gas pressure and thus a constant cutter pressure. This arrangement results in less loss of fruit through the varying thickness of the peeling due to the varying pressure of a spring.

It is therefore an object of this invention to provide a cutter mechanism for peeling fruit such as pears.

It is a further object of this invention to provide such a device wherein means are provided for discouraging deep gouging in the surface of the fruit being peeled as such fruit is rotated adjacent the peeling knife.

It is a further object of this invention to provide a cutter mechanism which can be adjusted quickly to provide the peeling pressure required at a given moment and as quickly changed to a different peeling pressure without stopping the machine.

It is a further object of this invention to provide such a structure wherein the damping is accomplished by the movement of a liquid through a restriction and the peeling pressure may be readily controlled by varying the gas pressure applied to the liquid surface.

Still a further object of this invention is to provide a mechanism to maintain a substantially constant peeling pressure on the cutter and thereby increase the yield of satisfactorily peeled fruit while requiring a minimum of hand trimming.

Other objects and advantages of this invention, if not specifically set forth, will become apparent during the course of the description which follows.

Generally, this invention relates to a mechanism for peeling pears mounted for rotation adjacent said cutter mechanism wherein there is provided a supporting means for the cutter mechanism, a rotatable or stationary shaft having a knife secured thereto at one end thereof, means mounting said shaft to the supporting means at the end of the shaft opposite the knife, supporting means permitting pivotal movement of the knife radially toward and away from the core of the fruit held adjacent the knife as the radius of the fruit undergoing peeling varies, means to maintain the pressure of the cutter on the fruit at any predetermined level, irrespective of the extent to which the fruit diameter varies and, finally, means to damp pivotal movement of the shaft-mounting means whereby to oppose rapid oscillation of the knife relative to the surface of the fruit undergoing peeling. The last-mentioned means consists of a piston-piston rod assembly, one end of said piston rod supporting said piston and the other end of said rod bearing directly or indirectly against said pivotally mounted shaft, a cylinder for said piston within which said piston may reciprocate, means providing a fluid-tight seal between said piston and the walls of said cylinder, a passage for a liquid extending from the end of said cylinder opposed to said piston rod, said passage terminating at the opposite end thereof in a reservoir partially filled with hydraulic fluid, and means for permitting a source of gas under adjustable pressure to be placed in communication therewith whereby to apply any predetermined gas pressure to the liquid in the passage. Preferably, the passage also has a narrowly constricted portion so as to provide resistance to rapid flow of liquid through the passage, as would be required to permit rapid uncontrolled oscillation of the knife mechanism; yet such an arrangement provides little resistance to the slower, normal motion of the knife mechanism in following the contour of the fruit, thus maintaining a constant peeling pressure on the fruit being peeled which is in proportion to the gas pressure applied to the liquid surface in the reservoir.

Figure 3:
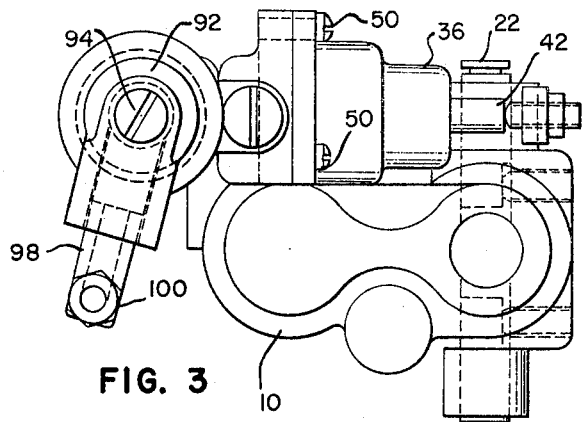
FIGURE 3 is a plan view of the mechanism of this invention on a scale slightly reduced from that of FIGURE 2.
Figure 1:
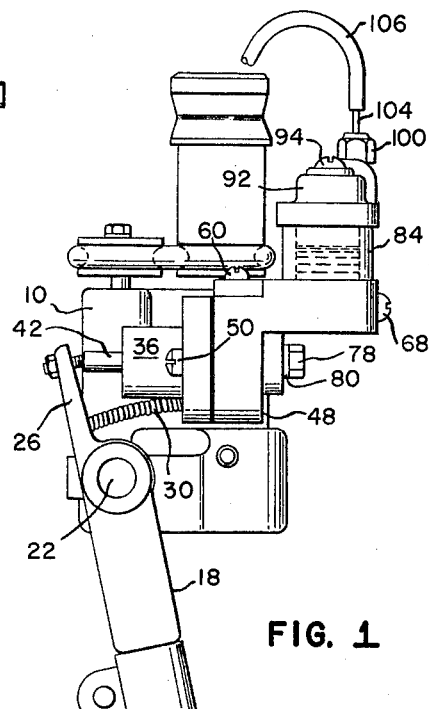
FIGURE 1 is a side elevation of the cutter assembly of this invention.
Figure 2:
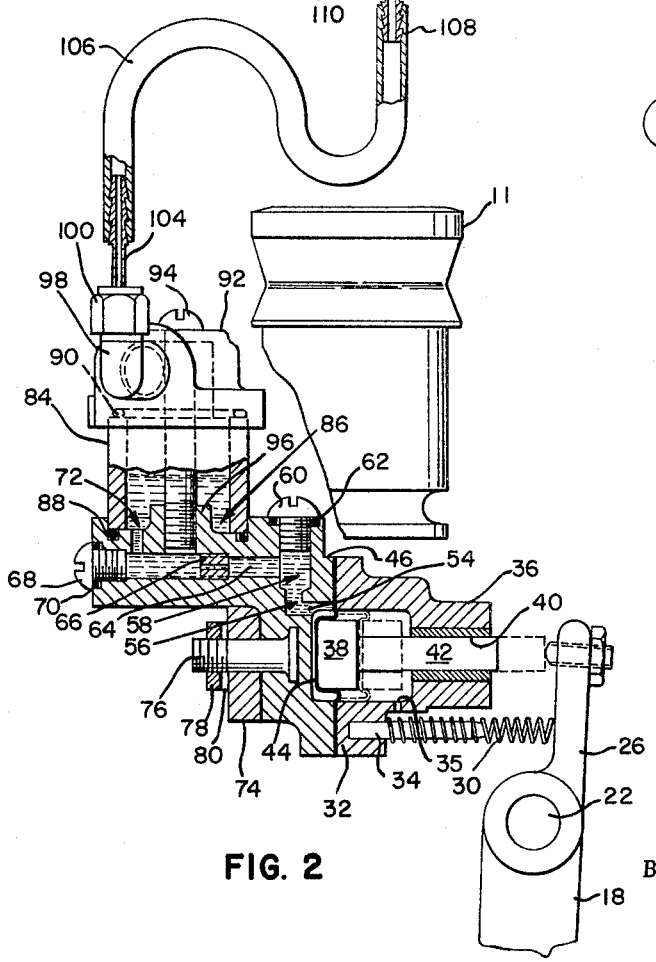
FIGURE 2 is an enlarged partial sectional view of the structure of FIGURE 1 where the structure has been rotated 180° from the position of FIGURE 1.

Referring now to the drawings wherein like characters refer to like parts throughout, there is shown a cutter mechanism similar to that of Patent No. 3,058,502 which may be substituted directly for the corresponding structure shown in the patent. The apparatus consists essentially of a supporting memebr 10 for a pulley 11 and pivoted cutter mechanism, generally 9, which are capable of together being moved longitudinally of a pear or other fruit impaled on a coring tube, the pear being adjacent the knife 12. Shaft 14 supports the knife and turns within the fixed tube 16. The tube 16 is mounted in a Y-shaped yoke having a pair of arms 18. The yoke is pivoted to the supporting member 10 about pins 22. One arm 18 of the yoke has an upstanding finger 26 against which bears compression spring 30. The spring bridges the space between the upstanding finger 26 and the shoulder 32 supporting stud 34. The spring is very light and serves only a safety function in the event of failure of the air pressure-hydraulic fluid system to be described below, which develops the primary pressure holding the cutter 12 against a pear. The housing 36 having vent hole 35 provides a cylinder within which piston 38 reciprocates. The neck of the cylindrical cap of housing 36 also has an internal bushing 40 against which piston rod 42 slides. In FIGURE 2, the piston and piston rod are shown in two extreme positions with the location of the finger 26 being appropriate for the position shown by the dashed lines. At the left side of the piston, as seen in FIGURE 2, an elastomeric sealing diaphragm 44 provides a fluid seal between that portion of the chamber to the right of the piston and that portion to the left of the piston, so that an hydraulic fluid may be retained in the left-hand portion and excluded from the right. The sealing element 44 is held between the shoulder 32 on the housing 36 and the abutting shoulder 46 of the L-shaped block 48. Screws 50 hold the cap or housing 36 in place thereon. The block element 48 is counter-bored sufficiently to receive one end of piston 38. A passage may be seen through the block 48 beginning adjacent the piston 38. A notch 54 in the side wall connects at right angles with passage segment 56. The segment 56 terminates in an enlarged portion 58 tapped into the shoulder of element 48. The outer extremity of the enlarged portion is occupied by screw 60.

An O-ring 62 between the screw head and the shoulder prevents escape of hydraulic fluid in the passage. Passage segment 64 is provided with removable plug 66 set therein which has a narrowly constricted orifice hole therethrough to permit passage of liquid at a carefully limited rate. The plug should be removable so that the size of the orifice hole may be changed whenever required. Any suitable valve may be substituted for the plug 66. The opposite end of segment 64 of the passage is sealed by means of screw 68 and O-ring 70. A further passage segment 72 enters the side wall defining passage segment 64 and provides communication with the exterior of the entire block element 48. Block 48 is secured to bracket 74 (element 24 of the aforementioned patent) by means of stud 76 and hex jam nut 78 having washer 80. The bracket is integral with the supporting elemnt 10. Glass cylinder 84 is seated against the cylindrical counter-sunk portion 86 and sealed thereagainst by means of O-ring 88, O-ring 90, cap 92 and screw 94, also provided with an O-ring, not shown, which is tapped into the boss 96 formed adjacent the side wall of the passage segment 64. Tapped in the side of the cap 92 in a passage for the receipt of elbow 98 having a fitting 100 which secures adapter 104 by means of a sleeve (not shown) in place against the end of the elbow 98. To the adapter 104 is connected a length of flexible tubing 106, in turn connected to a second adapter 108 of an air manifold 110 which provides air under preselected pressure controlled by an air regulator to maintain a constant predetermined pressure on the hydraulic fluid, irrespective of the level of liquid in the glass cylinder. This fixes the pressure of the knife against the pear at a predetermined setting, irrespective of the pear diameter.

Water may be used as the hydraulic fluid; the transparent glass cylinder 84 serves as a reservoir for the water and permits inspection of the water level and maintenance of the proper level at approximately half way up the glass 84.

In operation, power is transmitted through a belt to drive the pulley, which in turn drives the shaft on which is mounted the rotary knife 12. This is the preferred structure, though a stationary knife might be used with less satisfactory results. The pear, impaled upon a core tube positioned immediately adjacent the knife 12, is contacted by the knife as the cutter mechanism 9 is swung radially under the influence of the air-hydraulic system. Pins 22 about which the yoke arms 18 turn permit the knife to follow the exterior of the pear (or other fruit) as the diameter thereof varies, the fruit being moved relative to the knife or the entire cutter assembly being moved longitudinally of the pear (as in the preferred embodiment). When such a fruit as a pear is being peeled, the alternate relatively soft and relatively firm portions or irregularities, as described earlier, urge the knife and shaft to pivot rapidly about the pins 22 to the extent of a fraction of a degree.

In the absence of a damping action, this rapid motion tends to continue so that the knife may lift from the surface of the fruit, leaving a skip in the peeling. The knife then tends to gouge the fruit as it returns rapidly to the surface of the fruit. This rapid action is quickly damped out by the impedance offered to the flow of liquid through the orifice of plug 66. Specifically, as a projecting irregularity of the pear is contacted, the arm 18 tends to swing so that the finger 26 forces the piston rod 42 inwardly and liquid is pushed through passage segments 56, 58, 64, and 72. Rapid liquid flow is resisted by the relatively small orifice in the plug 66. A predetermined constant gas pressure (suitable for the ripeness of the fruit being peeled), preferably from 5 to 20 p.s.i., is applied through flexible tubing 106. Rapid oscillation of the knife relative to the surface of the pear undergoing peeling is thus damped solely by the action of the hydraulic system working through the restricted orifice of plug 66, and the knife tends to ride evenly and under a constant pressure on the exterior of any surface of reasonable regularity, irrespective of the presence of adjacent relatively soft and relatively hard sections. Relatively slower radial movements of the knife 12 and shaft 14, however, are not inhibited to any substantial extent as the piston or plunger 38 is permitted to reciprocate relatively slowly, with little impedance, as the pear undergoing peeling varies in diameter.

The spring 30, being very light, acts primarily as a safety feature in the event that gas pressure through line 106 fails. In normal use, the hydraulic system with its superimposed air pressure is alone relied upon to assure that the cutting knife remains against the pear surface. The use of a manifold line as a supply for air under pressure is preferred as it enables all the peeling heads on a machine or all the machines in a line of machines to be served by the same air pressure which may be rapidly raised or lowered by means of an air regulator interposed between the high pressure air source and the manifold.

Obviously, many modifications and variations of this invention may be made without departing from the spirit and scope thereof, and therefore only such limitations should be imposed as are indicated in the appended claims.

We claim:
1. In a cutter mechanism for peeling a pear mounted for rotation adjacent said cutter mechanism, the improvements comprising:
 (a) supporting means for said cutter mechanism;
 (b) a shaft having a knife secured thereto;
 (c) means mounting said shaft to said supporting means at the end of said shaft opposite said knife, said means permitting pivotal movement of the knife radially toward and away from the core of a pear held adjacent said knife as the radius of the pear undergoing peeling varies;
 (d) and means secured to said supporting means and said shaft resisting rapid movement of said knife and said shaft radially but permitting slow radial movement of said shaft and said knife relative to said pear, said means comprising a piston-piston rod assembly, one end of said piston rod supporting said piston and the other end of said rod governing pivotal action of the said shaft, a chamber for said piston within which said piston may reciprocate, means providing a fluid-tight seal between said piston and the walls of said chamber, and a passage for a liquid extending from the end of said chamber generally opposed to said piston rod, said passage terminating in a source of gas under pressure and being at least partially filled with an hydraulic fluid.

2. In a cutter mechanism for peeling a pear mounted for rotation adjacent said cutter mechanism, the improvements comprising:
 (a) supporting means for said cutter mechanism;
 (b) a shaft having a knife secured thereto;
 (c) means mounting said shaft to said supporting means at the end of said shaft opposite said knife, said means permitting pivotal movement of the knife radially toward and away from the core of a pear held adjacent said knife as the radius of the pear undergoing peeling varies;

(d) and means secured to said supporting means and said shaft resisting rapid movement of said knife and said shaft radially but permitting slow radial movement of said shaft and said knife relative to said pear, said means comprising a piston-piston rod assembly, one end of said piston rod supporting said piston and the other end of said rod governing pivotal action of the said shaft, a chamber for said piston within which said piston may reciprocate, means providing a fluid-tight seal between said piston and the walls of said chamber, a passage for a liquid extending from the end of said chamber generally opposed to said piston rod, said passage having a narrow constriction therein to permit flow of liquid therethrough with difficulty, said passage terminating in a source of gas under pressure and being at least partially filled with an hydraulic fluid, the passage section partially filled with hydraulic fluid including portions of said passage for a liquid on either side of said narrow constriction.

3. In a cutter mechanism for peeling a pear mounted for rotation adjacent said cutter mechanism, the improvements comprising:

(a) supporting means for said cutter mechanism;
(b) a shaft having a knife secured thereto;
(c) means mounting said shaft to said supporting means at the end of said shaft opposite said knife, said means permitting pivotal movement of the knife radially toward and away from the core of a pear held adjacent said knife as the radius of the pear undergoing peeling varies;
(d) and means secured to said supporting means and said shaft resisting rapid movement of said knife and said shaft radially but permitting slow radial movement of said shaft and said knife relative to said pear, said means comprising a piston-piston rod assembly, one end of said piston rod supporting said piston and the other end of said rod being in contact with the said pivotally-mounted shaft, a chamber for said piston within which the said piston may reciprocate, means providing a fluid-tight seal between said piston and the walls of said chamber, a passage for a liquid extending from the end of said chamber opposed to said piston rod, said fluid passage having a constriction therein to permit flow of liquid therethrough with difficulty, said passage being at least partially filled with an hydraulic fluid and being connected at the opposite end thereof to a source of gas under pressure, the passage section partially filled with hydraulic fluid including portions of said passage for a liquid on either side of said narrow constriction, said source of gas under pressure having means for providing a predetermined constant pressure against liquid in the said passage and chamber.

4. In a cutter mechanism for peeling a pear mounted for rotation adjacent said cutter mechanism, the improvements comprising:

(a) supporting means for said cutter mechanism;
(b) a shaft having a knife secured thereto;
(c) means mounting said shaft to said supporting means at the end of said shaft opposite said knife, said means permitting pivotal movement of the knife radially toward and away from the core of a pear held adjacent said knife as the radius of the pear undergoing peeling varies;
(d) and means secured to said supporting means and said shaft resisting rapid movement of said knife and said shaft radially but permitting slow radial movement of said shaft and said knife relative to said pear, said means comprising a piston-piston rod assembly, one end of said piston rod supporting said piston and the other end of said rod being in contact with the said pivotally-mounted shaft, a chamber for said piston within which the said piston may reciprocate, means providing a fluid-tight seal between said piston and the walls of said chamber, a passage for a liquid extending from the end of said chamber opposed to said piston rod, said passage having a constriction therein to permit flow of liquid therethrough with difficulty, said passage being at least partially filled with an hydraulic fluid and being connected at the opposite end thereof to a source of gas under pressure, the passage section partially filled with hydraulic fluid including portions of said passage for a liquid on either side of said narrow constriction, said source of gas under pressure having means for providing a predetermined constant pressure against liquid in the said passage and chamber, said passage having a reservoir for an hydraulic fluid therein, said reservoir being of a cross-sectional area in excess of the cross-sectional area of the remaining portions of said passage, said reservoir being positioned between said constriction in said passage and said source of gas under pressure and having hydraulic fluid therein.

5. In a cutter mechanism for peeling a pear mounted for rotation adjacent said cutter mechanism, the improvements comprising:

(a) supporting means for said cutter mechanism;
(b) a shaft having a knife secured thereto;
(c) means mounting said shaft to said supporting means at the end of said shaft opposite said knife, said means permitting pivotal movement of the knife radially toward and away from the core of a pear held adjacent said knife as the radius of the pear undergoing peeling varies;
(d) and means secured to said supporting means and said shaft resisting rapid movement of said knife and said shaft radially but permitting slow radial movement of said shaft and said knife relative to said pear, said means comprising a piston-piston rod assembly, one end of said piston rod supporting said piston and the other end of said rod being in contact with the said pivotally-mounted shaft, a chamber for said piston within which the said piston may reciprocate, means providing a fluid-tight seal between said piston and the walls of said chamber, a passage for a liquid extending from the end of said chamber opposed to said piston rod, said passage having a constriction therein to permit flow of liquid therethrough with difficulty, said passage having a reservoir for an hydraulic fluid connected thereto at the end thereof farthest removed from said chamber for said piston, said reservoir being of a cross-sectional area in excess of the cross-sectional area of the said passage, said reservoir normally being positioned above the said fluid passage and above the said chamber for the said piston, at least a portion of the chamber for the said piston, the entire passage for a liquid, and at least a portion of the said reservoir being filled with an hydraulic fluid; and
(e) means for applying a predetermined gas pressure to the liquid in the said reservoir.

References Cited by the Examiner

UNITED STATES PATENTS

| | | | |
|---|---|---|---|
| 3,058,502 | 10/1962 | Loveland et al. | 146—43 |
| 3,088,264 | 5/1963 | Sallee | 146—43 X |
| 3,115,171 | 12/1963 | Loveland | 146—43 |

LESTER M. SWINGLE, *Primary Examiner.*

W. GRAYDON ABERCROMBIE, *Assistant Examiner.*